United States Patent [19]
Wilms

[11] Patent Number: 5,007,734
[45] Date of Patent: Apr. 16, 1991

[54] APPARATUS FOR MEASURING THE REFRACTION CHARACTERISTICS OF OPHTHAMOLOGICAL LENSES

[76] Inventor: Karl-Heinz Wilms, Hans-Bierling-Str. 47, D-8089 Emmering, Fed. Rep. of Germany

[21] Appl. No.: 192,517
[22] PCT Filed: Aug. 30, 1987
[86] PCT No.: PCT/DE87/00385
 § 371 Date: Apr. 29, 1988
 § 102(e) Date: Apr. 29, 1988
[87] PCT Pub. No.: WO88/01735
 PCT Pub. Date: Mar. 10, 1988

[30] Foreign Application Priority Data

Sep. 1, 1986 [DE] Fed. Rep. of Germany ....... 3629676

[51] Int. Cl.$^5$ .......................................... G01M 11/02
[52] U.S. Cl. ..................................................... 356/124
[58] Field of Search ................ 356/124, 125, 126, 127

[56] References Cited

U.S. PATENT DOCUMENTS

| | | | |
|---|---|---|---|
| 1,542,112 | 6/1925 | Tillyer | 356/125 |
| 1,726,820 | 9/1929 | Glancy | 356/125 |
| 3,019,708 | 2/1962 | French et al. | 356/125 |
| 3,445,169 | 5/1969 | Lueck | 356/124 |
| 3,519,357 | 7/1970 | Davis | 356/124 |

FOREIGN PATENT DOCUMENTS 1166502 3/1964 Fed. Rep. of Germany ...... 356/124

Primary Examiner—Samuel Turner
Attorney, Agent, or Firm—Antonelli, Terry, Stout & Kraus

[57] ABSTRACT

An apparatus for measuring the refraction characteristics of ophthalmological lenses comprises a projection optic for projecting light of a light source via a field aperture with a measuring figure and the ophthalmological lens arranged on a lens support onto a light reception means, the refraction characteristics of the ophthalmological lens being determined from the image site of the measuring figure in at least one direction. The apparatus for varying the vergency of the light beam on the object side of the ophthalmological lens between a position in which the refraction characteristics for the object distance are determined infinitely and at least one alterable position in which the refraction characteristics are determined for finite object distances. The lens support is the lens support means being arranged stationary and enables the ophthalmological lens to be definedly raised and positioned diagonally in the beam path, and at least one of a dioptric and prism compensation element is provided for disposition in the beam path of the diagonally arranged ophthalmological lens for enabling adjustment to a specific dioptric measuring range.

11 Claims, 1 Drawing Sheet

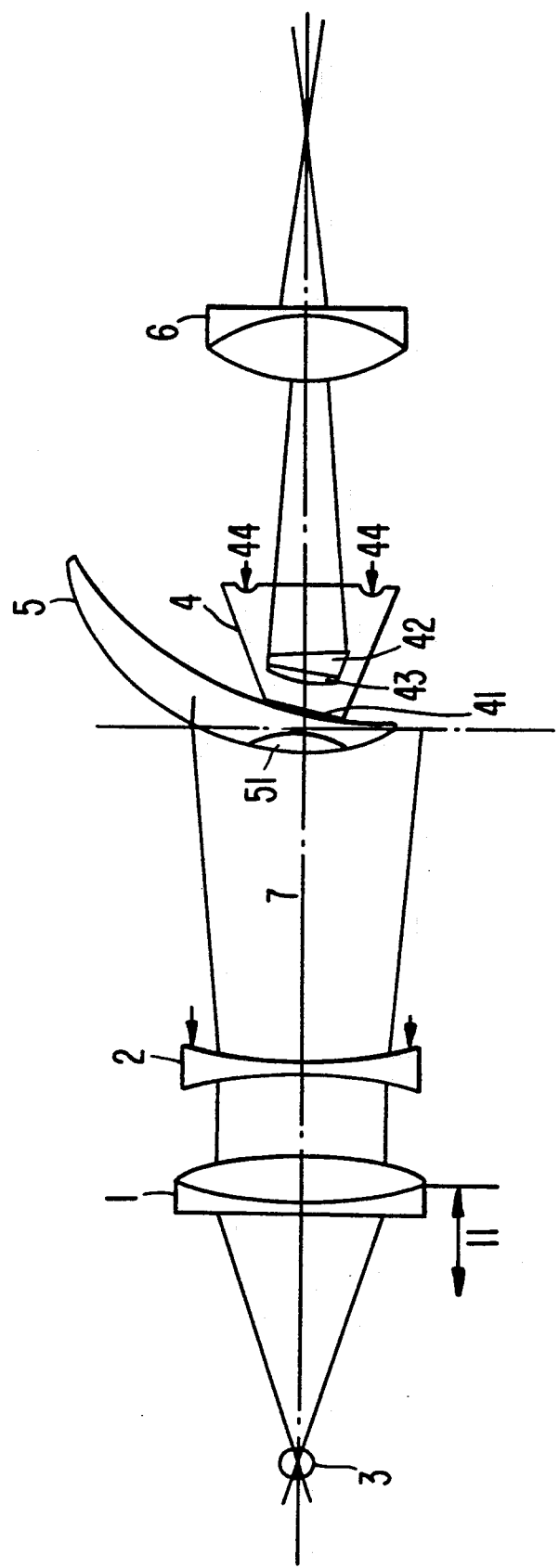

APPARATUS FOR MEASURING THE REFRACTION CHARACTERISTICS OF OPHTHAMOLOGICAL LENSES

The present invention relates to an apparatus for measuring the refraction characteristics of ophthalmological lenses, in which a projection optic projects the light of a light source via a field aperture with a measuring figure and the ophthalmological lens, which is arranged on a lens support, onto a light reception device and the refraction characteristics are determined from the image site of the measuring figure in the lateral and/or longitudinal direction.

Such apparatuses are also called apex refracting power gauges and are known in various designs, by way of illustration as automatic apex refracting power gauges, with which a test object is imaged, as projection or telescope apex refracting power gauges, etc. A not-all-encompassing survey of the different possible designs is given by the article "Geräte zur Messung des Scheitel-brechwertes" in *Augenoptik*, 1984, pp 67-70 and the article "Aufbau und Funktion von Meßgeräten zur automatischen Messung des Scheitelbrechwerts" in *Deutsche Ootiker-Zeitung* 3/1980 pp. 9-21.

Prior art apex refracting power gauges usually operate with parallel beam paths and determine the so-called distance apex refracting power. A principle measurement error arises when measuring multi-focal lenses with apex refracting power gauges of this type. With regard to this, reference is made to Dr. W. Roos' articles, by way of illustration, in the *Suddeutsche Optiker Zeitung*, 1953, or his special print "Über den Strahlengang im Nahteilvon Zweistärkengläsern". In order to eliminate this principle measurement error, an apex refracting power gauge has been suggested in which the lens can be rotated about an axial point located 25 mm behind the eye-facing surface. This apex refracting power gauge is briefly mentioned in the article "Brillengläser mit gleitender optischer Wirkung" by Dr. Josef Reiner, in the *Suudd Ootikerzeitung*, 1961, pp 114 ff and, in particular, on p. 116. Such apex refracting power gauges with a rotatable lens arrangement have not made a significant impact in practice.

One reason for this is probably the complicated assembly plus the unaltered beam path, still yielding systematical measurement errors, which is intended for measuring the distance apex refracting power.

The object of the present invention is to provide an apparatus for measuring the refraction characteristics of ophthalmological lenses, which also permits determining the so-called near apex refracting power, to put it more precisely, the effective use-value.

A solution to this object, in accordance with the present invention, and further embodiments thereof is defined in the patent claims hereto.

An inventive element is that the beam path of the apparatus can be altered corresponding to the desired distanCe from the object. When the "distance from the object is infinite", the beam path in most apparatuses is, however, not necessarily a parallel beam path. For measuring the near apex refractive power or the effective use-value, the vergency of the beam path is altered for the infinite distance from the object in such a manner that it corresponds to the use position. By way of illustration, in the case of a specific optical build-up of the invented apparatus, the parallel beam path may be converted into a divergent beam path (near vergency) by moving the projection optic and/or adding supplementary lenses.

In order to hit the ophthalmological lens with this beam path, which corresponds to the use-position, the stationary lens support is designed in such a manner that the ophthalmological lens is positioned "diagonally to the beam path" in the beam path corresponding to the use-position.

The divergence resulting from positioning the ophthalmological lens "diagonally" in the beam path in near apex measurement is compensated for by dioptric and/or prism compensation, by way of illustration, a lens or a small additional prism.

By this means, without a rotation device, i.e. without moving parts, the effective use-value of ophthalmological lenses for near distances can be determined with an apparatus for measuring the refraction characteristics of ophthalmological lenses.

It is particularly advantageous when the dioptric and/or prism compensation are integrated in the lens support. By this means not only the close spacial arrangement between the ophthalmological lens and the dioptric and/or prism compensation is guaranteed, but also the lens support and its respective compensation elements may be exchanged in one step.

The invented embodiment of an apparatus may be combined with very different apex refracting power gauges. The apex refracting power gauges, may be, by way of illustration, projection apex refracting power gauges or even apex refracting power gauges, which measure the refraction characteristics automatically or, at least, display digitally.

At any rate, it is advantageous if the sensors detect the vergency of the light beam and/or the beam path in the inserted lens support and/or the inserted compensation elements. By way of illustration, with an automatic apex refracting power gauge, the output signals of these sensors can be utilized to correct measurement results corresponding to the desired near distance. Also in the case of hand-operated apex refracting power gauges, in which only the display is automatic, the display can be switched to the near apex refracting power by means of the output signals of the sensors. At any rate, it is advantageous if the prism compensation, by way of illustration, is of variable design in that a Herschel compensator is provided.

The present invention is made more apparent in the following section using preferred embodiments thereof and with reference to the drawing, the only figure of which depicts an optical sketch of an invented embodiment of an apex refracting power gauge.

A lens 1, having positive refracting power, and a lens 2, having negative refracting power, form together a collimator for the light of a light source 3, which is not shown in more detail. The vergency of the pencil of light behind lens 2 may, by way of illustration, be altered by moving lens 1 in the direction of an arrow 11 and/or by exchanging lens 2 or by inserting an additional lens, which is not depicted. in the beam path. Not-depicted sensors, which, by way of illustration, detect the position of lens 1, inform the evaluation unit, which is also not illustrated, which vergency the beam path has during measuring. In the beam path behind lens 2 is arranged a lens holder or a lens support 4 for an ophthalmological lens 5, by way of illustration a bifocal lens. The light penetrating the ophthalmological lens 5 and the lens holder 4 is projected by an additional lens 6 onto a not-depicted light reception device.

The lens support 4 is provided with a supporting surface 41 in such a manner that the ophthaLmological lens 5 can be placed on it with its near segment 51 in a specific angle of inclination to an optical axis 7. An exchangeable dioptric and/or prism compensation is integrated in lens support 4, which, by way of illustration, comprises a prism 42 and/or a lens 43, which can be put in the beam path selectively singly or combined.

Moreover, the lens support is provided with recesses 44, into which the sensors, by way of illustration microswitches, engage. Depending on the position of the switch, an evaluation unit, which is not depicted in detail, is hit by signals, which inform the evaluation unit of the design of the lens support 4 situated in the beam path, that is the angle of inclination of the ophthalmological lens and the dioptric and/or prism correcton.

The following table gives, by way of example, the support dimensions, the prismatic side effects and the prism for the preferred embodiments of invented lens supports for specific dioptric ranges of ophthalmological lenses 4 of the angles of inclination of ophthalmological lenses compared to horizontal lines.

| dpt-range | Support size | Angle of inclination | Prismat. side effects | Prism cm/m |
|---|---|---|---|---|
| −7 to +8 | 2.1 | 16° | −10 to +10 | 0 |
| +10 to +16 | 2,75 | 22° | +11 to +20 | 15 |
| +16 to +20 | 2,9 | 23,5° | +20 to +25 | 20 |
| −8 to −14 | 1,35 | 9,4° | −10 to −20 | 15 |
| −14 to −16 | 0,8 | 6° | −17 to −22 | 20 |

In the preceeding section, the present invention has been described, by way of illustration, with reference to a preferred embodiment without the intention of limiting the scope or spirit of the present invention. Many very different modifications are, of course, possible within the overall inventive idea—to alter the vergency of the light beam and to arrange the lens defined diagonally to the optical axis and to additionally provide a dioptric and/or prism compensation. Thus many different measures may be carried out to alter the vergency of the beam path.

Furthermore, by way of illustration, the lens support may be designed in such a manner that its angle of inclination is adjustable and it can be provided with many different correction elements.

What I claim is:

1. An apparatus for measuring the refraction characteristics of ophthalmological lenses comprising a projection optic for projecting light of a light source via a field aperture and the ophthalmological lens arranged on a lens support means onto a light reception means, the refraction characteristics of the ophthalmological lens being determined from an image site in at least one direction, means for varying the vergency of the light beam on the object side of the ophthalmological lens between a position in which the refraction characteristics for the object distance are determined infinitely and at least one alterable position in which the refraction characteristics are determined for finite object distances, the lens support means being arranged stationary and enabling the ophthalmological lens to be definedly raised and positioned diagonally in the beam path, and compensation means for the diagonally arranged opthalmological lens for enabling adjustment to a specific dioptric measuring range being arranged for disposition in the beam path.

2. An apparatus according to claim 1, wherein the compensation means comprises at least one of a dioptric and prism compensation element.

3. An apparatus according to claim 2, wherein the compensation means is integrated with the lens support means.

4. An apparatus according to claim 1 or 3, wherein the means for varying the vergency of the light beam includes means for at least one of adjustably positioning at least one element of the projection optic and at least one supplementary lens for disposition in the beam path to as to provide a parallel beam path and a divergent beam path to enable measurement of the distance apex refracting and the near refracting power, respectively.

5. An apparatus according to claim 1, wherein the lens support means comprises a plurality of exchangeable lens supports having different angles of inclination, one of the plurality of lens supports being selected for supporting the ophthalmological lens in the beam path.

6. An apparatus according to claim 1, wherein the light reception means comprises one of a telescope and a ground glass.

7. An apparatus according to claim 1, wherein the light reception means comprises a detector array providing an output to an evaluation means for determining the refraction characteristics taking into consideration the object vergency of the light beam.

8. An apparatus according to claim 7, wherein the detector array includes sensors for detecting at least one of the vergency of the light beam and the positioning of the lens support placed in the beam path, the sensors providing an output to the evaluation means.

9. An apparatus according to claim 1, wherein the lens support means includes means for adjusting the height and inclination thereof and is connectable to the compensation means.

10. An apparatus according to claim 1, wherein the means for varying the vergency of the light beam enables varying of the vergency between a parallel beam for enabling measurement of the distance apex refracting power and a diverging light beam for enabling measurement of the near apex refracting power.

11. An apparatus according to claim 10, wherein the means for varying the vergency to provide a diverging light beam includes means for disposing at least one supplementary lens in the beam path.

* * * * *